United States Patent
Nielsen et al.

(10) Patent No.: US 9,857,548 B2
(45) Date of Patent: Jan. 2, 2018

(54) FIBER OPTIC CABLE ASSEMBLY

(71) Applicant: Corning Optical Communications LLC, Hickory, NC (US)

(72) Inventors: Lars Kristian Nielsen, Hickory, NC (US); Humberto Perez Toledo, Reynosa (MX); Ricardo Andre Rivas Alas, Fort Worth, TX (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/274,172

(22) Filed: Sep. 23, 2016

(65) Prior Publication Data

US 2017/0010433 A1    Jan. 12, 2017

Related U.S. Application Data

(63) Continuation of application No. PCT/US2015/022900, filed on Mar. 27, 2015.

(60) Provisional application No. 61/975,192, filed on Apr. 4, 2014.

(51) Int. Cl.
*G02B 6/44* (2006.01)
*G02B 6/255* (2006.01)

(52) U.S. Cl.
CPC ......... *G02B 6/4475* (2013.01); *G02B 6/4473* (2013.01); *G02B 6/2558* (2013.01); *G02B 6/4497* (2013.01)

(58) Field of Classification Search
None
See application file for complete search history.

(56) References Cited

U.S. PATENT DOCUMENTS

| | | |
|---|---|---|
| 6,856,748 B1 | 2/2005 | Elkins, II et al. |
| 7,272,282 B1 | 9/2007 | Seddon et al. |
| 2005/0259928 A1 | 11/2005 | Elkins et al. |

(Continued)

FOREIGN PATENT DOCUMENTS

| | | |
|---|---|---|
| WO | 2007103437 A2 | 9/2007 |
| WO | 2009016424 A1 | 2/2009 |

OTHER PUBLICATIONS

Patent Cooperation Treaty, International Search Report and Written Opinion for PCT/US2015/22900, dated Jul. 20, 2015, 9 pages.

(Continued)

*Primary Examiner* — Mike Stahl
(74) *Attorney, Agent, or Firm* — William D. Doyle

(57) ABSTRACT

A cable assembly includes a distribution cable, a tether cable, and a network access point (NAP) assembly having a cavity defined therein. The distribution cable includes optical fibers and the tether cable includes an optical fiber. The optical fiber of the tether cable is tightly constrained within the tether cable and portion thereof extends from the tether cable into the cavity of the NAP assembly and is spliced to a portion of one of the optical fibers of the distribution cable extending into the cavity of the NAP assembly from a side of the distribution cable. The splice is positioned in the cavity. Tight constraint of the optical fiber of the tether cable within the tether cable limits transmission of fiber movement to the portion of the optical fiber of the tether cable extending into the cavity of the NAP assembly, thereby protecting the splice.

19 Claims, 2 Drawing Sheets

(56) References Cited

U.S. PATENT DOCUMENTS

| | | | |
|---|---|---|---|
| 2005/0276562 A1* | 12/2005 | Battey | G02B 6/4454 |
| | | | 385/135 |
| 2007/0263964 A1 | 11/2007 | Cody et al. | |
| 2008/0181570 A1* | 7/2008 | Mullaney | G02B 6/4475 |
| | | | 385/135 |
| 2008/0247719 A1 | 10/2008 | Cody et al. | |
| 2009/0022460 A1 | 1/2009 | Lu et al. | |
| 2009/0285539 A1 | 11/2009 | Lewallen et al. | |
| 2010/0054679 A1* | 3/2010 | Cody | G02B 6/4475 |
| | | | 385/113 |
| 2013/0251319 A1 | 9/2013 | Compton et al. | |

OTHER PUBLICATIONS

EP15772772.8 Search Report dated Nov. 3, 2017, European Patent Office.

* cited by examiner

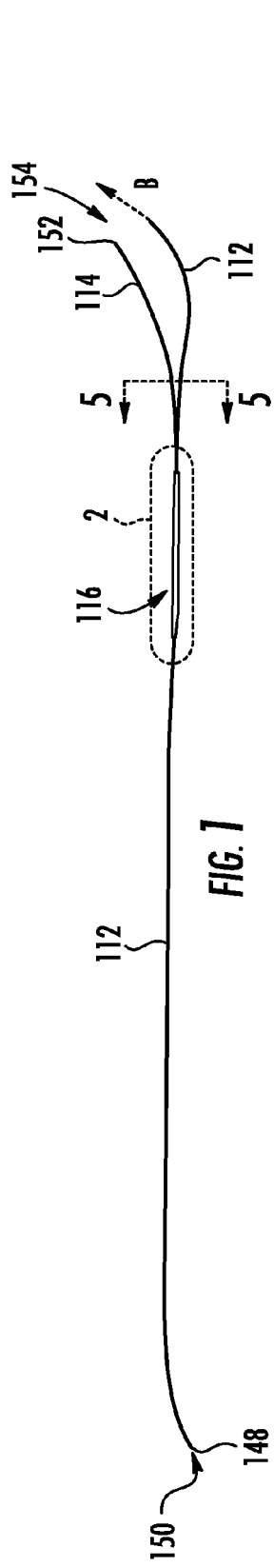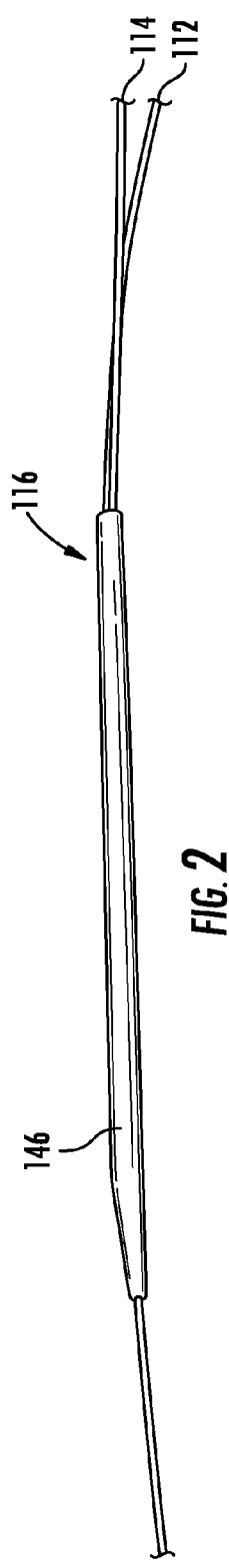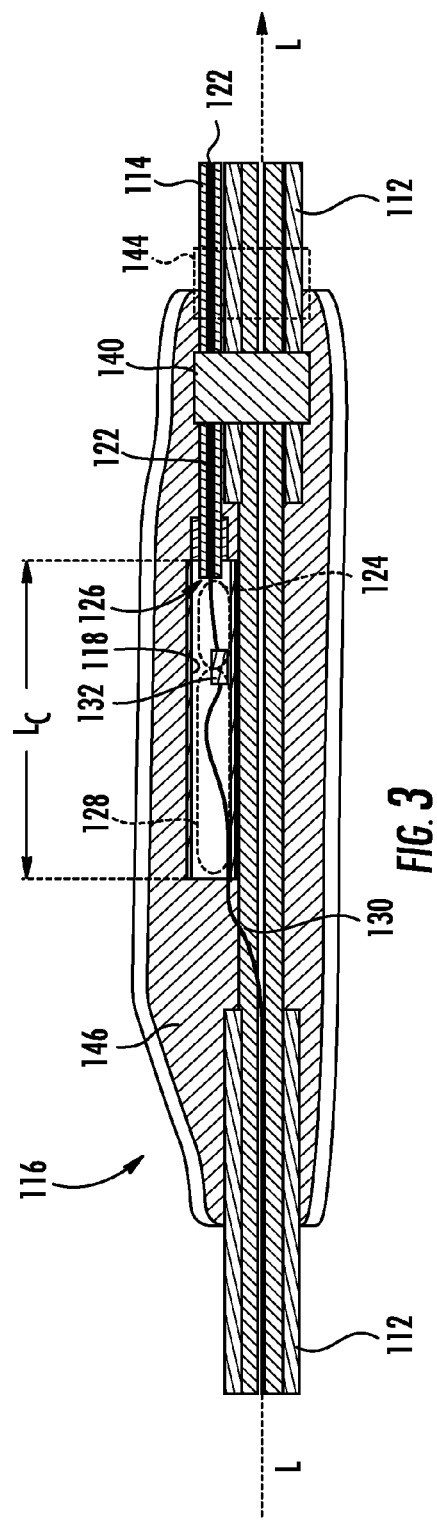

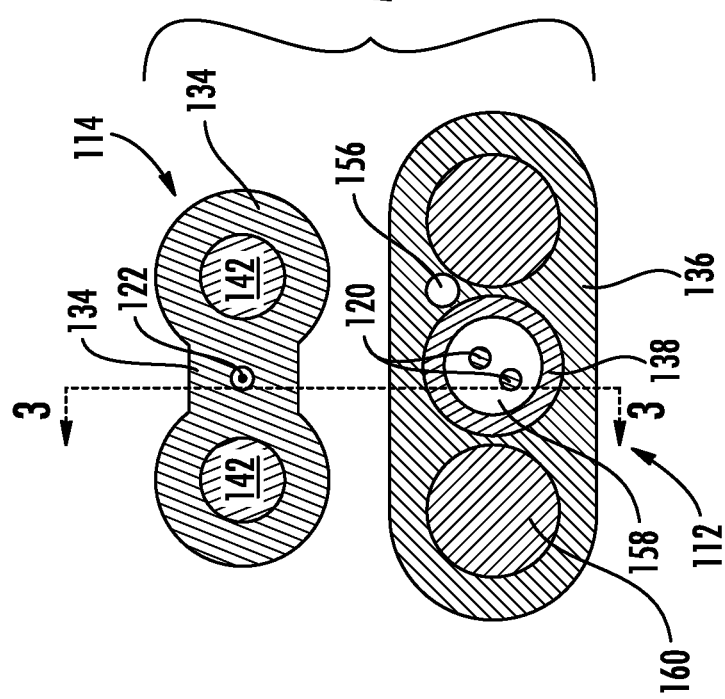
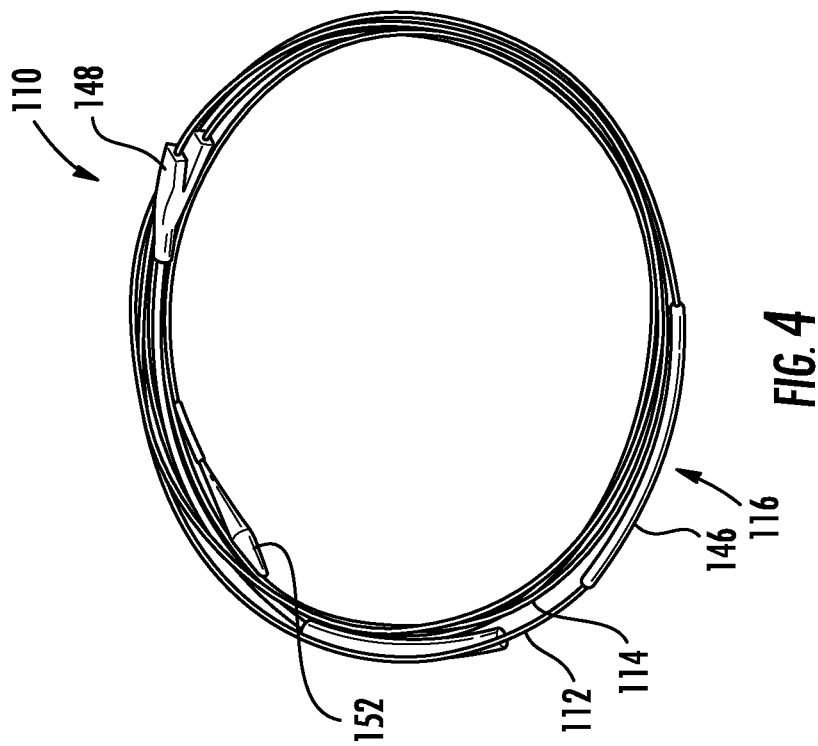

FIBER OPTIC CABLE ASSEMBLY

CROSS-REFERENCE TO RELATED APPLICATIONS

This application is a continuation of International Application No. PCT/US2015/22900, filed on Mar. 27, 2015, which claims the benefit of priority under 35 U.S.C. §119 of U.S. Provisional Application Ser. No. 61/975,192, filed on Apr. 4, 2014, the content of which is relied upon and incorporated herein by reference in their entirety.

BACKGROUND

Aspects of the present disclosure relate generally to fiber optic cable assemblies, such as those that include network access points where a communication element of a distribution cable is optically connected to a communication element of a tether cable that branches off from the distribution cable.

Some cable assemblies with network access points use a splice to connect optical fibers from a tether cable to optical fibers of a distribution cable. The optical fibers route signals from the distribution cable through the tether cable to a connector on an opposing end thereof. Typically excess length of the optical fibers of the tether cable is stored in a cavity within the network access point assembly. The excess fiber length allows the tether cable to be stretched and bent, where the excess fiber length then fills into the tether cable, as needed, to alleviate tension in the optical fiber and splice as a result of fiber movement resulting from the stretching and bending. However, for many cable assemblies the amount of excess optical fiber length stored in the cavity is related to the length of the respective tether cable. Longer tether cables require a greater amount of excess fiber length to compensate for stretching and a correspondingly longer cavity. This variation in cable assembly structure leads to manufacturing inefficiency and opens the door to potential manufacturing and design challenges, such as calculation of the amount of excess optical fiber length to be stored in the cavity.

A need exists for a fiber optic cable assembly, including a network access point, with structure or attributes that allow for a uniform length of excess fiber length to be stored in the cavity of a network access assembly without regard to the length of an associated tether cable.

SUMMARY

Some embodiments relate to a fiber optic cable assembly that includes a distribution cable, a tether cable, and a network access point (NAP) assembly having a cavity defined therein. The distribution cable includes optical fibers and the tether cable includes an optical fiber. The optical fiber of the tether cable is tightly constrained within the tether cable. A portion of the optical fiber of the tether cable extends from a proximal end of the tether cable into the cavity of the NAP assembly and is spliced to a portion of one of the optical fibers of the distribution cable that is extending into the cavity of the NAP assembly from an opening in a side of the distribution cable. The splice of the portions of optical fibers is positioned in the cavity. Tight constraint of the optical fiber of the tether cable within the tether cable limits transmission of fiber movement to the portion of the optical fiber of the tether cable extending into the cavity of the NAP assembly, thereby at least partially isolating and protecting the splice from optical fiber strain.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serves to explain principles and operations of the various embodiments. As such, the disclosure will become more fully understood from the following Detailed Description, taken in conjunction with the accompanying Figures, in which:

FIG. 1 is a side view of a fiber optic cable assembly according to an exemplary embodiment.

FIG. 2 is a digital image of a network access point assembly of the fiber optic assembly similar to the network access point encircled in FIG. 1 denoted 2.

FIG. 3 is a cross-sectional view of a network access point assembly similar to the assembly of FIG. 2, taken along line 3-3 of FIG. 5, according to an exemplary embodiment.

FIG. 4 is a digital image of a cable assembly similar to the cable assembly of FIG. 1.

FIG. 5 is a cross-sectional view of a tether cable and a distribution cable of the cable assembly of FIG. 1 taken along line 5-5 of FIG. 1, according to an exemplary embodiment.

DETAILED DESCRIPTION

Referring to FIGS. 1-2 and 5, a fiber optic cable assembly 110 includes a distribution cable 112, a tether cable 114, and a network access point (NAP) assembly 116 having a cavity 118 defined therein. A tube, such as a Teflon tube, may be used to form the cavity 118. The distribution cable 112 includes optical fibers 120 and the tether cable 114 includes an optical fiber 122. In some embodiments, the distribution cable 112 includes 4, 8, 12, or more of the optical fibers 120. Likewise the tether cable 114 may include multiple optical fibers 122.

The optical fibers 120, 122 may be optical fibers with glass core and cladding surrounded by a protective polymeric coating. In some such embodiments, the optical fibers 120, 122 may be bend insensitive, tight-buffered (e.g., having an outer diameter of about 1 mm or less), single-mode, multi-mode, multi-core, ribbonized, 250-micron diameter optical fibers, 200-micron diameter optical fiber, and/or other types or arrangements of optical fibers. In some embodiments, as shown in FIG. 5, the tether cable 114 includes only one optical fiber 122.

According to an exemplary embodiment, the optical fiber 122 of the tether cable 114 is tightly constrained within the tether cable 114. In some embodiments, the tether cable 114 has a jacket 134. The jacket 134 may define the exterior of the tether cable 114 and may be formed from a thermoplastic polymeric material, such as including and/or primarily including polyethylene, polyvinyl chloride, low-smoke-zero-halogen materials, and/or other materials. In some embodiments, the jacket 134 surrounds and tightly adjoins the optical fiber 122 of the tether cable 114. In some such embodiments, the jacket 134 actually contacts the optical fiber 122, such as directly contacting the outermost polymeric coating, ribbon matrix, or tight-buffer layer defining the exterior of the optical fiber 122 or fibers. In other contemplated embodiments, the jacket 134 is pressure extruded over an intermediate element, such as tensile strength yarn (e.g., aramid, fiberglass, etc.), tape (e.g., water-swellable tape, fire-retardant tape), etc., which then contacts and/or constrains the optical fiber(s). According to an exemplary embodiment, the optical fiber 122 is constrained by the jacket 134 of the tether cable 114. For example, the optical fiber 122 of the tether cable 114 may be constrained such that pulling the optical fiber 122 of the tether cable 114 lengthwise from a straight meter-long section (cut section having open, unconstrained ends) of the tether cable 114 fractures the optical fiber 122 before the optical fiber 122 may be fully withdrawn from the meter-long section, which evidences that the optical fiber 122 of the tether cable 114 is highly coupled to the tether cable 114. Commercially-available cables that may include such structures and attributes include, so-called butterfly drop cables or pixian cables and ROC™ Drop cables manufactured by Corning Inc. Commercially-available cables that may include structure and attributes of the distribution cable 112 include RPX® Gel-Free Ribbon cables and SST-Drop™ Dielectric cables manufactured by Corning Inc. Compare the tight constraint of the optical fiber 122 within the jacket 134 of the tether cable 114 with the loosely contained optical fibers 120 in a buffer tube 138 of the distribution cable 112.

In some embodiments, the optical fiber 122 of the tether cable 114 substantially lacks excess fiber length within the tether cable 114 relative to the length of the tether cable 114 such that at room temperature (23° C.) the length of the optical fiber 122 for a meter-long section of the tether cable 114 is less than a half of a centimeter longer than the meter-long section of the tether cable 114. In some embodiments, at room temperature (23° C.) the length of the optical fiber 122 for the meter-long section of the tether cable 114 is less than a quarter of a centimeter longer than the section. In some embodiments, at room temperature (23° C.) the length of the optical fiber 122 for the meter-long section of the tether cable 114 is a meter or less. In some embodiments, at room temperature (23° C.) the optical fiber 122 of the tether cable 114 is actually less than a meter when removed from the tether cable 114 such that the optical fiber 122 within the tether cable 114 is in strain at room temperature, such as between about 0.1% and 5% strain, such as between about 0.5% and 4% strain. Manufacturing the tether cable 114 with the optical fiber 122 having low amount of strain at room temperature may help prevent buckling of the optical fiber 122 in cold temperatures, if the tether cable 114 shrinks.

According to an exemplary embodiment, a portion 124 (FIG. 3) of the optical fiber 122 of the tether cable 114 extends from a proximal end 126 of the tether cable 114 into the cavity 118 of the NAP assembly 116 and is spliced to a portion 128 of one of the optical fibers 120 of the distribution cable 112 that is extending into the cavity 118 of the NAP assembly 116 from an opening 130 (FIG. 3) in a side (e.g., sidewall) of the distribution cable 112 through a jacket 136 of the distribution cable 112. The portion 128 of the optical fiber 120 extending into the cavity 118 may be locked down prior to entry of the cavity 118 by epoxy or other adhesive or overmold material on a side of the cavity 118 to isolate the portion 128 of the optical fiber 120 from fiber movement within the distribution cable 112. During manufacturing of the NAP assembly 116, the portion 128 of the optical fiber 120 of the distribution cable 112 may be accessed and severed at a first location, then withdrawn from the distribution cable 112 at a second location, spaced apart lengthwise from the first location, to provide a sufficient length of the portion 128 for splicing and excess fiber length to be stored in the cavity 118. In some embodiments, the splice 132 of the portions 124, 128 of optical fibers 122, 120 is positioned in the cavity 118 and may be enclosed in a splice protector, such as a 40-millimeter long tube with a metallic rod support. In other embodiments, the splice 132 may be positioned in either the distribution cable 112 or the tether cable 114.

Applicants believe that use of the tether cable 114 with the constrained optical fiber 112 allows for a standardized cavity geometry and corresponding NAP assembly structure regardless of the length of the tether cable 114 because tight constraint of the optical fiber 122 of the tether cable 114 within the tether cable 114 limits transmission of fiber movement to the portion 124 of the optical fiber 122 of the tether cable 114 extending into the cavity 118 of the NAP assembly 116, thereby isolating and protecting the splice 132 from strain carried by the optical fiber 122 of the tether cable 114. According to an exemplary embodiment, the cavity 118 of the NAP assembly 116 extends lengthwise along the distribution cable 114 a distance $L_C$ and, in some such embodiments, the net length within the cavity 118 of the optical fiber portions 124, 128 spliced together is greater than the distance $L_C$, where the greater amount of net length provides a strain window to the optical fiber portions 124, 128 that mitigates loading on the splice 132 when the NAP assembly 116 stretches or bends by allowing the optical fiber portions 124, 128 to straighten out or move to a lower-stress position within the cavity 118. However, the net length within the cavity 118 of the optical fiber portions 124, 128 spliced together is less than 7 millimeters greater than the distance $L_C$, at least in part due to the tight constraint of the optical fiber 112 of the tether cable 114 within the tether cable 114 limiting transmission of fiber movement to the portion 124 of the optical fiber 112 extending into the cavity 118 of the NAP assembly 116. The net length of the optical fiber portions 124, 128 may be defined as the sum of the lengths of each portion 124, 128 measured from the splice 132 to the position in which the respective portion 124, 128 enters the cavity 132. The net length within the cavity 118 of the optical fiber portions 124, 128 is substantially maintained regardless of bending or stretching of the cable assembly in embodiments where the optical fibers are locked down when not in the cavity 118, such as by an epoxy plug (e.g., two-part epoxy, Loctite® E-05CL™ Hysol® Epoxy Adhesive, ultra-violet light curable epoxy), material of an overmold 146 (e.g., polyurethane), and/or tight constraint of the respective cable, such as the tight constraint provided by the tether cable 114 of the optical fiber 122 within the tether cable 114. In some embodiments, the net length within the cavity 118 of the optical fiber portions 124, 128 spliced together is less than 5 millimeters greater than the distance $L_C$, less than 3 millimeters greater than the distance $L_C$ and/or is at least 0.5 millimeters greater than $L_C$, such as at least a millimeter greater than $L_C$. In some embodiments, the cavity length $L_C$ is about 2 feet, such as 2 feet plus or minus 6 inches. In other embodiments, the cavity length $L_C$ is between about a foot and three feet. In still other embodiments, the cavity length $L_C$ is a positive value and less than five feet, such as less than about 1.5 meters along the lengthwise axis L, such as less than about 1 meter along the lengthwise axis L. Cavities of conventional NAP assemblies may be much longer due to the correspondingly larger amount of excess fiber length stored therein to facilitate stretching and bending of the respective tether cable, which may require a correspondingly greater amount of overmold material and may also result in a corresponding decrease in bending performance of the overall assembly due to the length of the NAP assembly.

Applicants believe that use of the present technology allows for stretching and bending of the tether cable 114 while mitigating impact on the splice 132. For example, in some contemplated embodiments, the portion 124 of the optical fiber 122 of the tether cable 114, extending from the tether cable 114 into the cavity 118 of the NAP assembly 116, is substantially isolated from bending of the tether cable 114 such that the net length within the cavity 118 of the optical fiber portions 124, 128 spliced in the cavity 118 changes by less than 10% when the tether cable 114 is wrapped in a 50-centimeter diameter loop, compared to when the tether cable 114 extends in a generally straight path lengthwise from the NAP assembly 116 along distribution cable 112. In some such embodiments, the net length within the cavity 118 of the optical fiber portions 124, 128 spliced therein changes by less than 5% when the tether cable 114 is wrapped in the loop, compared to when the tether cable 114 extends in the generally straight path. In some embodiments, the portion 124 of the optical fiber 122 of the tether cable 114, extending from the tether cable 114 into the cavity 118 of the NAP assembly 116, is substantially isolated from stretching of the tether cable 114 such that the net length within the cavity 118 of the optical fiber portions 124, 128 changes by less than 10% when the tether cable 114 is stretched by 1% strain, compared to when the tether cable 114 is not stretched. In some such embodiments, the net length within the cavity 118 of the optical fiber portions 124, 128 spliced therein changes by less than 5% when the tether cable 114 is stretched by 1% strain, compared to when the tether cable 114 is not stretched.

According to an exemplary embodiment, the tether cable 114 is attached to the NAP assembly 116 such that the tether cable 114 remains attached to the NAP under a 100 pounds-force (about 445 Newtons) pull-out load applied to the tether cable, according to GR-3122 testing standards. In some embodiments, the tether cable 114 remains attached to the NAP under a 150 pounds-force pull-out load and/or even a 200 pounds-force pull-out load. In some contemplated embodiments, the cable assembly 110 further includes a crimp body 140 (FIG. 3) coupling the tether cable 114 to the distribution cable 112, such as a metallic band that is bent, twisted, or otherwise clamped around the tether and distributions cables 114, 112 to bind the cables 114, 112 together.

According to an exemplary embodiment, the tether cable 114 includes strength rods 142 (FIG. 5), such as glass-reinforced plastic rods, on opposing sides of the optical fiber 122 and the crimp body extends around the strength rods 142, such as contacting the jacket 134 in which the strength rods 142 are embedded. In some embodiments, the strength rods 142 are wider than the optical fiber 122 of the tether cable 114 such that the strength rods 142 bear much of the compressive loading of the crimp body 140 and thereby mitigate transmission of the compressive loading to the optical fiber 122 of the tether cable 114, which may limit attenuation of the optical fiber 122 due to the crimping loads. In other contemplated embodiments, additional and/or alternative bonding components may be used to provide high pull-out performance of the tether cable 114, such as use of an adhesive plug 144 (e.g., epoxy plug) attaching the tether cable 114 to the distribution cable 112. The adhesive plug 144 may be positioned beneath the overmold 146 and/or adjoining an end of the overmold 146.

Referring to FIGS. 1 and 4, the NAP assembly 116 is part of the cable assembly 110. In some embodiments, the cable assembly 110 further includes a multi-fiber connector 148 attached to a distal end 150 of the distribution cable 112. In some embodiments, the multi-fiber connector 148 is a ruggedized outdoor connector, such as an OptiTip® MT Connector manufactured by Corning Inc. The tether cable 114 may also include a connector 152 attached to a distal end 154 thereof. In some embodiments, such as where the tether cable 114 is a single-fiber cable, the connector 152 is a single-fiber connector, such as a ruggedized outdoor connector, such as an OptiTap® Single-Fiber Connector manufactured by Corning Inc.

FIG. 1 shows the distribution cable extending beyond what is shown in the Figure, as denoted by the arrow B. In some embodiments, the cable assembly 110 includes multiple tether cables 114, as disclosed herein, optically connected to the distribution cable 112 via discrete NAP assemblies 116 spaced apart from one another lengthwise along the distribution cable 112, such as at least four, at least six, or twelve or more NAP assemblies and/or no more than 72 NAP assemblies with spacing thereof of at least 2 meters apart from one another, such as at least 10 meters and/or no more than 1000 meters in between adjacent NAP assemblies. In some contemplated embodiments, two or more tether cables 114 may be optically connected to the distribution cable 112 (i.e., the fibers 120 therein) via the same NAP assembly 116, such as by arranging the respective tether cables 114 side-by-side with one another on a side of the distribution cable 112, by arranging the respective tether cables 114 on opposite sides of the distribution cable 112, or otherwise arranging the respective tether cables 114.

According to an exemplary embodiment, the overmold 146 of the NAP assembly 116 is largely formed from a thermoplastic polymer, such as at least 70% by volume thereof, and has a narrow, elongate profile that allows the NAP assembly to be flexible, which may benefit installation and placement of the NAP assembly in narrow conduits, ducts, etc. Additionally, use of a single-fiber tether cable 114, as disclosed herein, allows for a particularly narrow NAP assembly profile, compared to many conventional NAP assemblies. For example, the overmold 146 may define the exterior of the NAP assembly 116. In some embodiments, the widest cross-sectional dimension (i.e., "cross-sectional," meaning orthogonal to the length L axis) of the overmold 146 is 25 millimeters or less, such as about 20 millimeters ±10%. In some such embodiments, the cross-sectional dimension of the overmold 146 orthogonal to the widest cross-sectional dimension is 22 millimeters or less, such as about 18 millimeters ±10%, such that the NAP assembly 116 may be particularly well configured to be routed through narrow ducts and channels. The overmold of the NAP assembly 116 may be relatively short in length, such as less than about 2 feet long, such as less than 20 inches, such as 18 inches ±2 inches, which may facilitate overall flexibility of the cable assembly 110. In other embodiments, the NAP assembly 116 may be otherwise sized.

The construction and arrangements of the cable assemblies, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. For example, the cables 112, 114 may be otherwise shaped in cross-section and may include other components in alternative to or in addition to those disclosed above, such as water-swellable elements (e.g., water-swellable yarn 156, embedded water-swellable powder, etc.), gel or grease filler material 158, additional strength elements 160, as shown in FIG. 5. The fiber optic cable assembly may include metallic communication elements (e.g., copper, aluminum, steel wires in place of the strength rods 142, 160) in addition to or as an alternative to optical fibers. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A fiber optic cable assembly, comprising:
a distribution cable comprising optical fibers;
a tether cable comprising an optical fiber extending lengthwise therein, wherein the optical fiber of the tether cable is tightly constrained within the tether cable along the length of the tether cable; and
a network access point (NAP) assembly having a cavity defined therein,
wherein a portion of the optical fiber of the tether cable extends from the tether cable into the cavity of the NAP assembly and is spliced to a portion of one of the optical fibers of the distribution cable extending into the cavity of the NAP assembly from a side of the distribution cable, and wherein the splice is positioned in the cavity of the NAP assembly, and
wherein the NAP assembly comprises an overmold of thermoplastic polymer, wherein the widest cross-sectional dimension of the overmold is 25 millimeters or less and the cross-sectional dimension of the overmold orthogonal to the widest cross-sectional dimension is 22 millimeters or less.

2. The assembly of claim 1, wherein the cavity of the NAP assembly extends lengthwise along the distribution cable a distance $L_C$ and wherein the net length within the cavity of the optical fiber portions spliced together is greater than the distance $L_C$, whereby the greater amount of net length provides a strain window to the optical fiber portions that mitigates loading on the splice when the NAP assembly stretches or bends by allowing the optical fiber portions to straighten out within the cavity; and wherein the net length within the cavity of the optical fiber portions spliced together is less than 7 millimeters greater than the distance $L_C$.

3. The assembly of claim 1, wherein the portion of the optical fiber of the tether cable extending from the tether cable into the cavity of the NAP assembly is substantially isolated from bending of the tether cable such that the net length within the cavity of the spliced optical fiber portions changes by less than 10% when the tether cable is wrapped in a 50-centimeter diameter loop compared to when the tether cable extends in a generally straight path lengthwise from the NAP assembly along distribution cable.

4. The assembly of claim 3, wherein the net length within the cavity of the optical fiber portions spliced therein changes by less than 5% when the tether cable is wrapped in the loop compared to when the tether cable extends in the generally straight path.

5. The assembly of claim 1, wherein the portion of the optical fiber of the tether cable extending from the tether cable into the cavity of the NAP assembly is substantially isolated from stretching of the tether cable such that the net length within the cavity of the spliced optical fiber portions changes by less than 10% when the tether cable is stretched by 1% strain compared to when the tether cable is not stretched.

6. The assembly of claim 5, wherein the net length within the cavity of the optical fiber portions spliced therein changes by less than 5% when the tether cable is stretched by 1% strain compared to when the tether cable is not stretched.

7. The assembly of claim 1, wherein the optical fiber of the tether cable is constrained such that pulling the optical fiber of the tether cable lengthwise from a meter-long section of the tether cable fractures the optical fiber before the optical fiber is fully withdrawn from the meter-long section.

8. The assembly of claim 1, wherein the tether cable has a jacket and wherein the jacket of the tether cable surrounds and adjoins the optical fiber of the tether cable, whereby the optical fiber of the tether cable is at least in part constrained by the jacket of the tether cable.

9. The assembly of claim 8, wherein the optical fiber of the tether cable comprises a glass core and cladding surrounded by a polymeric coating such that the outer diameter of the optical fiber of the tether cable is about 250 micrometers or less, and wherein the jacket of the tether cable contacts the polymeric coating.

10. The assembly of claim 1, wherein the optical fiber of the tether cable substantially lacks excess fiber length within the tether cable relative to the length of the tether cable such that at room temperature (23° C.) the length of the optical fiber for a meter-long section of the tether cable is less than a half of a centimeter longer than the section.

11. The assembly of claim 10, wherein at room temperature (23° C.) the length of the optical fiber for the meter-long section of the tether cable is less than a quarter of a centimeter longer than the section.

12. The assembly of claim 11, wherein at room temperature (23° C.) the length of the optical fiber for the meter-long section of the tether cable is a meter or less.

13. The assembly of claim 12, wherein at room temperature (23° C.) the optical fiber of the tether cable within the tether cable is in strain.

14. The assembly of claim 1, wherein the optical fiber of the tether cable is a tight-buffered optical fiber having an outer diameter of about 1 mm or less.

15. The assembly of claim 1, wherein the tether cable is a single-fiber cable.

16. The assembly of claim 15, further comprising a multi-fiber connector coupled to the optical fibers of the distribution cable on a distal end of the distribution cable; and a single-fiber connector coupled to the optical fiber of the tether cable on a distal end of the tether cable.

17. The assembly of claim 1, wherein the tether cable is attached to the NAP assembly such that the tether cable remains attached to the NAP assembly under a 100 pounds-force pull-out load applied to the tether cable.

18. The assembly of claim 17, further comprising a crimp body attaching the tether cable to the distribution cable, wherein the tether cable comprises strength rods on opposing sides of the optical fiber, wherein the crimp body extends around the strength rods, wherein the strength rods are wider than the optical fiber of the tether cable such that the strength rods bear compressive loading of the crimp body and mitigate transmission of the loading to the optical fiber of the tether cable, thereby limiting attenuation due to crimping loads.

19. The assembly of claim 17, further comprising an epoxy plug attaching the tether cable to the distribution cable.

\* \* \* \* \*